(12) United States Patent
Miller et al.

(10) Patent No.: US 12,352,848 B2
(45) Date of Patent: Jul. 8, 2025

(54) FORWARD DEPLOYED SENSOR SYSTEM

(71) Applicant: The United States of America, as represented by the Secretary of the Navy, Crane, IN (US)

(72) Inventors: Gerald F Miller, Bedford, IN (US); James L Stewart, Bloomington, IN (US); William F Crespo-Miranda, Bloomington, IN (US); Donald R Statter, Jr., Lousby, MD (US)

( * ) Notice: Subject to any disclaimer, the term of this patent is extended or adjusted under 35 U.S.C. 154(b) by 374 days.

(21) Appl. No.: 18/094,629

(22) Filed: Jan. 9, 2023

(65) Prior Publication Data

US 2023/0228869 A1 Jul. 20, 2023

Related U.S. Application Data

(60) Provisional application No. 63/301,164, filed on Jan. 20, 2022.

(51) Int. Cl.
*G01S 13/91* (2006.01)
*B63G 8/04* (2006.01)
(Continued)

(52) U.S. Cl.
CPC ............. *G01S 13/917* (2019.05); *B63G 8/04* (2013.01); *B63G 8/38* (2013.01); *G01S 7/003* (2013.01); *B63G 8/39* (2013.01)

(58) Field of Classification Search
CPC ...... G01S 13/917; G01S 7/003; G01S 13/937; B63G 8/04; B63G 8/22; B63G 8/38; B63G 8/39
See application file for complete search history.

(56) References Cited

U.S. PATENT DOCUMENTS 4,533,945 A * 8/1985 Lauvray ............... B63G 8/38
348/36
5,128,688 A * 7/1992 West ...................... H01Q 3/04
114/340

(Continued)

FOREIGN PATENT DOCUMENTS

CA  3085376 A1 * 6/2019 ............. B63G 8/16
EP  1739006 B1 * 11/2009 ............. B63G 8/00

*Primary Examiner* — Matthew M Barker
(74) *Attorney, Agent, or Firm* — Naval Surface Warfare Center, Crane Division; Patrick B. Law

(57) ABSTRACT

Generally, the present disclosure relates to a forward deployed sensor system or, in a specific embodiment, a forward deployed radar (FDR) system. The forward deployed sensor system includes a radar system and may also include other types of sensors such as optical sensors, acoustic sensors including sonar, and electromagnetic sensors. Further, the forward deployed sensor system may also include a communication system such as a full spectrum receiver/transmitter, a ship to ship relay transponder, a satellite communication system, and global positioning system (GPS) capability. The forward deployed sensor system is able to detect objects in the air, on the sea, and underwater, and communicate such detection to a ship, submarine, aircraft, satellite, or other remote location. Such systems may be used to augment the protection of shipping lanes by military or security forces to allow for peaceful commerce and utility of the sea by all nations.

16 Claims, 5 Drawing Sheets

(51) Int. Cl.
*B63G 8/38* (2006.01)
*G01S 7/00* (2006.01)
*B63G 8/39* (2006.01)

(56) References Cited

U.S. PATENT DOCUMENTS

| | | | | |
|---|---|---|---|---|
| 5,977,918 | A * | 11/1999 | Sirmalis | H01Q 3/26 343/709 |
| 7,230,881 | B2 * | 6/2007 | Howard | H04B 13/02 367/134 |
| 8,418,642 | B2 * | 4/2013 | Vosburgh | F42B 12/365 114/328 |
| 9,187,162 | B2 * | 11/2015 | Stella | B63G 8/38 |

* cited by examiner

FORWARD DEPLOYED SENSOR SYSTEM

CROSS-REFERENCE TO RELATED APPLICATIONS

The present application claims priority to U.S. Provisional Patent Application Ser. No. 63/301,164, filed Jan. 20, 2022, and entitled "FORWARD DEPLOYED SENSOR SYSTEM," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,621US01) is assigned to the United States Government and is available for licensing for commercial purposes. Licensing and technical inquiries may be directed to the Technology Transfer Office, Naval Surface Warfare Center Crane, email: Crane_T2@navy.mil.

FIELD

The field of the present disclosure relates generally to forward deployed sensor systems for use in naval or other maritime operations. More particularly, the disclosure pertains to a submersible forward deployed radar (FDR) system that may also include one or more of, sonar, electromagnetic, and optical detectors for detection of vessels or objects on or under the sea and telemetry means for communicating such detection to a remote location.

BACKGROUND

In naval and maritime operations, it is known for ships to employ radar systems for either defensive operations (e.g., detection of belligerent vessels or aircraft) or offensive operations (e.g., targeting of vessels or aircraft). Additionally, submarines may employ radar systems when travelling on the surface of the ocean, and then submerge to avoid detection. In either case of ships or submarines, there is increased risk when scanning for threats with radar as these vessels and the personnel manning such vessels are more easily detected and potentially placed in harm's way due to the need to be closer to the threats to be detected with the radar systems (i.e., forward deployment), and such proximity may be perceived as an aggressive posture, for example. Accordingly, a need exists to maintain tactical awareness using forward deployment positions for radar systems, while also promoting a passive ship posture to safeguard vessels and personnel.

SUMMARY

The present disclosure relates to unmanned submersible forward deployed sensor systems that are capable of being fully submerged to avoid detection and also have at least a portion that can surface/resurface when immediate threats are not present in order to perform radar scanning, as well as other types of detection such as using sonar, electromagnetic sensors, and/or optical sensors. Such systems allow forward deployment positions for detecting of threats using radar and other sensing, while also having the ability to selectively submerse to avoid detection and also not place human personnel in harm's way.

According to further aspects, the disclosed submersible forward deployed sensor systems may include that the portion capable of surfacing or resurfacing includes an array of sensors and has an articulated arm system attaching the array to a submersible body of the system, whereby the arm system allows selective raising of the array of sensors above the surface when threats are not present and lowering of the array of sensors below the surface to avoid detection by threats.

According to still further aspects, the disclosed submersible forward deployed sensor systems may be mobile and may include means for propulsion as well as means for controlling the level of submersion or buoyancy in order to provide the ability to optimally deploy and/or move to avoid detection.

According to yet further aspect, the disclosed submersible forward deployed sensor systems may include a means for selectively anchoring the system to maintain a position and not travel or drift due to wave motion.

Additional features and advantages of the present disclosure will become apparent to those skilled in the art upon consideration of the following detailed description of the illustrative embodiments including the best mode of carrying out the invention as presently perceived.

BRIEF DESCRIPTION OF THE DRAWINGS

The detailed description of the drawings particularly refers to the accompanying figures in which.

DETAILED DESCRIPTION

The various disclosed examples of the invention described herein are not intended to be exhaustive or to limit the invention to the specific examples disclosed. Rather, the examples selected for description have been chosen to enable one skilled in the art to practice the invention.

Generally, the present disclosure relates to a forward deployed sensor system or, in a specific embodiment, a forward deployed radar (FDR) system. The forward deployed sensor system includes a radar system and may also include other types of sensors such as optical sensors, acoustic sensors including sonar, and electromagnetic sensors. Further, the forward deployed sensor system may also include a communication system such as a full spectrum receiver/transmitter, a ship to ship relay transponder, a satellite communication system, and global positioning system (GPS) capability. The forward deployed sensor system is able to detect objects in the air, on the sea, and underwater, and communicate such detection to a ship, submarine, aircraft, satellite, or other remote location. Apart from military usage, such systems may also be used to augment the protection of shipping lanes by military or security forces to allow for peaceful commerce and utility of the sea by all nations.

Figure 1:
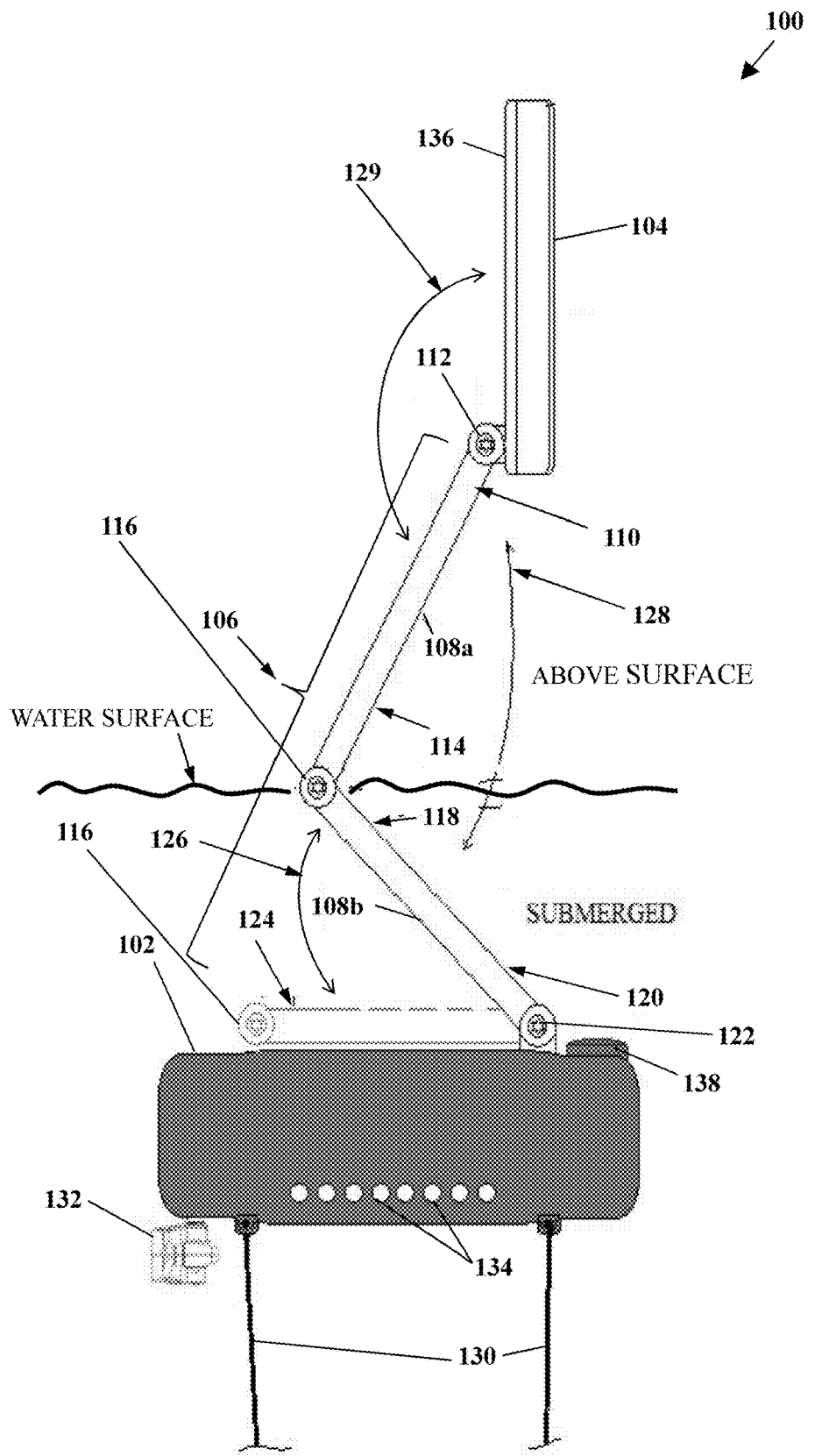
FIG. 1 shows a side view of a submersible forward deployed sensor system with a sensor array portion extended above a water surface and another portion submerged below the water surface according to one example.

FIG. 1 shows a side view of an exemplary submersible forward deployed sensor system 100 with a body portion 102 submerged below a water surface and a sensor array or sensor array portion 104 connected to the body portion 102 with a sensor array raising system (also referred to herein as a sensor raising/lowering system) 106 for raising and lowering the sensor array portion 104 with above or below the water surface.

In one aspect, the raising/lowering system 106 may configured as an articulated system using one or more rotatable arms and pivot joints or junctions to raise and lower the sensor array portion 104 with respect to the body portion 102, as well as to orient the sensor array portion 104 in an approximately vertical orientation or perpendicular to the water surface plane orientation when sensing is to be performed. In the particular example shown in FIG. 1, the raising/lowering system 106 includes a first arm 108a and a second arm 108b. The first arm 108a has a proximate end 110 rotatably coupled with the sensor array portion 104 at a first pivot junction 112 and a distal end 114 coupled to a second pivot junction 116. The second arm 108b has a distal end 118 coupled to the second pivot junction 116, which thereby rotatably couples the first arm 108a to the second arm 108b. A proximate end 120 of the second arm 108b is coupled to a third pivot junction 122 that is also affixed to the body portion 102 and allows for the second arm 108b to rotate with respect to the body portion 102. It is noted that each of the pivot junctions 112, 116, and 122 may be configured using a rotational hinge design or other means for rotational coupling of the arms as known in the art. Additionally, as discussed below, the pivot junctions 112, 116, and 122 may include a motive driver such as a motor to move one arm relative to the other arm rotationally around the pivot or hinge point.

In operation, the raising/lower system 106 allows the sensor array portion 104 to be lowered to position 124 (shown dashed as this is a potential positioning), which minimizes the profile and allows the sensor array portion 104 to be submerged, such as when threats are present or the system 100 is being deployed or transported. When sensing is desired, the raising/lower system 106 will raise the sensor array portion 104 by rotation of the arm 108b with respect to the body 102 as shown by arc 126, rotation of arm 108b with respect to arm 108a as shown by arc 128, and rotation of the sensor array portion 104 with respect to arm 108a as shown by arc 129. In order to provide motive force for these rotations, in one example each of the pivot junctions 112, 116, and 122 may include a motor, such as a stepper motor, to provide rotational force that allows a controller (to be discussed in connection with FIG. 5) to selectively and variably lower or raise the sensor array portion 104 by controlling the motors.

While the examples illustrated herein show the raising/lower system 106 configured with arms and pivot junctions, those skilled in the art will appreciate that other raising/lowering mechanisms could be utilized such as a pantograph-type mechanism or a telescoping shaft, as merely two examples.

In further exemplary embodiments, the system 100 may include means for anchoring or mooring the system 100 such that the system 100 remains stationary relative to the sea floor or generally fixed at a geospatial position. While the additional figures herein will discuss more details, FIG. 1 shows retractable mooring cables 130 connected to the body 102, such as the underside of the body 102, which are connected to mooring anchors (not shown in this figure).

According to yet further exemplary embodiments, the system 100 may include means for providing motive force to allow the system 100 to move or travel under its own power (or, alternatively, to remain stationary if wave force is acting on the system). An example of such means may include one or more electric thrusters 132 affixed to the body 102 to provide motive force for motion.

The system 100 may also include sensors below the water surface, such as acoustic sensors or sonar sensor as shown by acoustic or sonar sensors 134 located in the body portion 102. In still other examples, it is noted that the system may include means for renewable energy generation, such as with solar panels 136 coupled to the sensor array portion 104. Other sources of energy generation may include using wave motion (marine energy) to generate electricity, wind power, or fuel cells. Furthermore, for maintenance and access to electronics, power systems, and/or programming the system 100, the body 102 may also include an access hatch 138.

Figure 2:
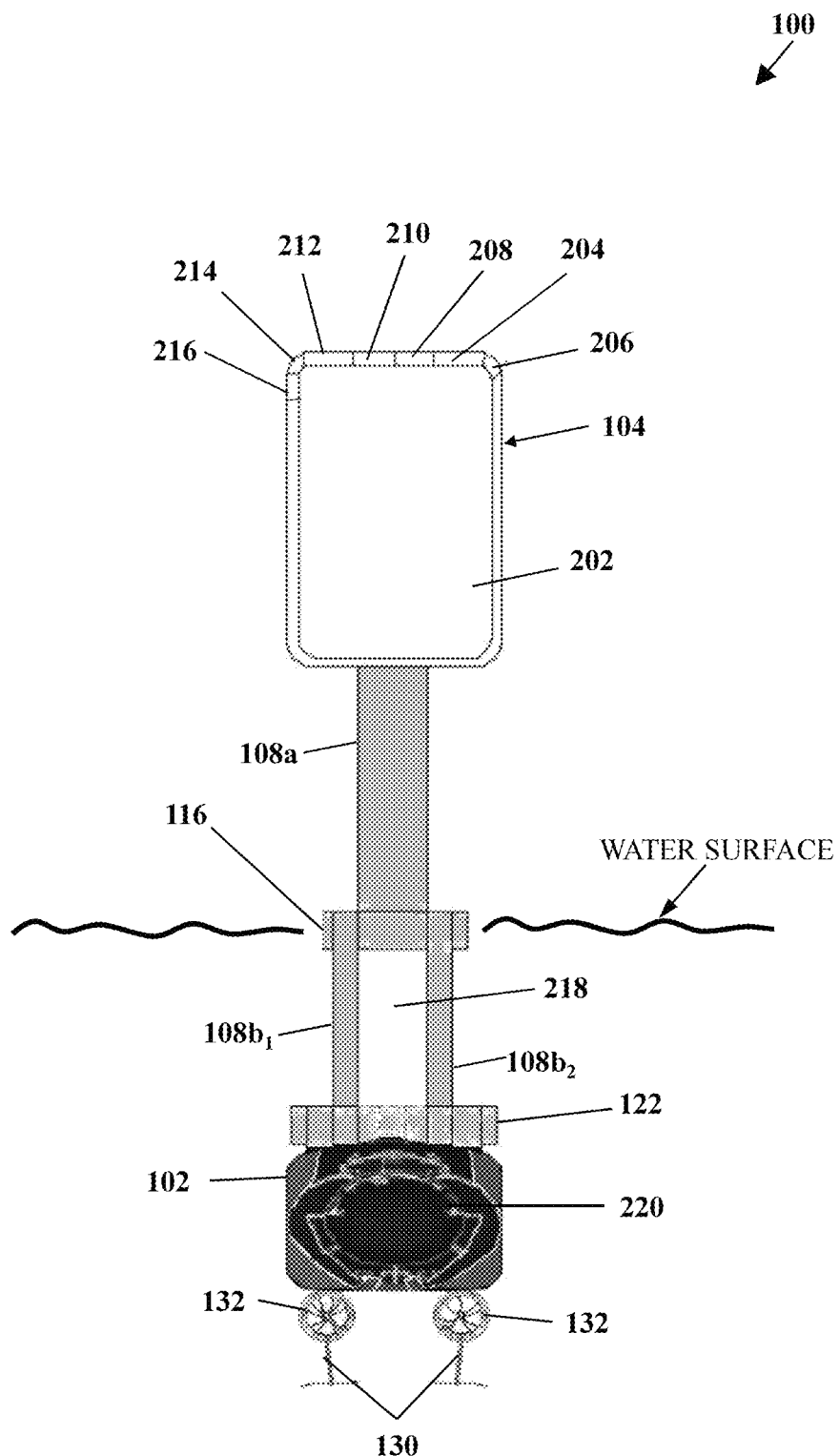
FIG. 2 shows an end view of the submersible forward deployed sensor system of FIG. 1.

FIG. 2 shows an end or elevation view of the submersible forward deployed sensor system 100 of FIG. 1 with the sensor array 104 raised above the water surface. This view illustrates that the sensor array 104 includes a number of different sensors and antennas. The sensor array 104 includes, but is not limited to, a radar sensor 202, an optical sensor or night/day camera 204, and other sensors 206 such as electromagnetic sensors. Additionally, the sensor array 104 may include various antenna such as an identification, friend or foe (IFF) antenna 208, a satellite antenna 210, a GPS antenna 212, communications antenna (or antenna array) 214 for radio frequency (RF) communications such as 5G or local area network (LAN) communications, and an optical communications transmitter/receiver device 216.

FIG. 2 also illustrates an exemplary construction for the raising/lowering system 106, although the disclosure is not limited to such. As may be seen, the second arm 108b is comprised of two sections 108bi and 108b2 with a gap 218 in between the two sections 108bi and 108b2. When the sensor array 104 is lowered, the first arm 108a may fit within the gap 218 to further reduce the profile of system 100 when the array 104 is fully retracted or lowered.

According to yet another example, the sensor body 102 may include a selective buoyancy system or ballast system 220 to be able to vary the depth that the body 102 is submersed below the water surface. In a particular example, the system 220 may be a ballast system that allows for filling or purging of water in a tank or balloon to control the weight displacement for controlling the depth of the system body 102 as well as provide for stability of the system 100.

Figure 3:
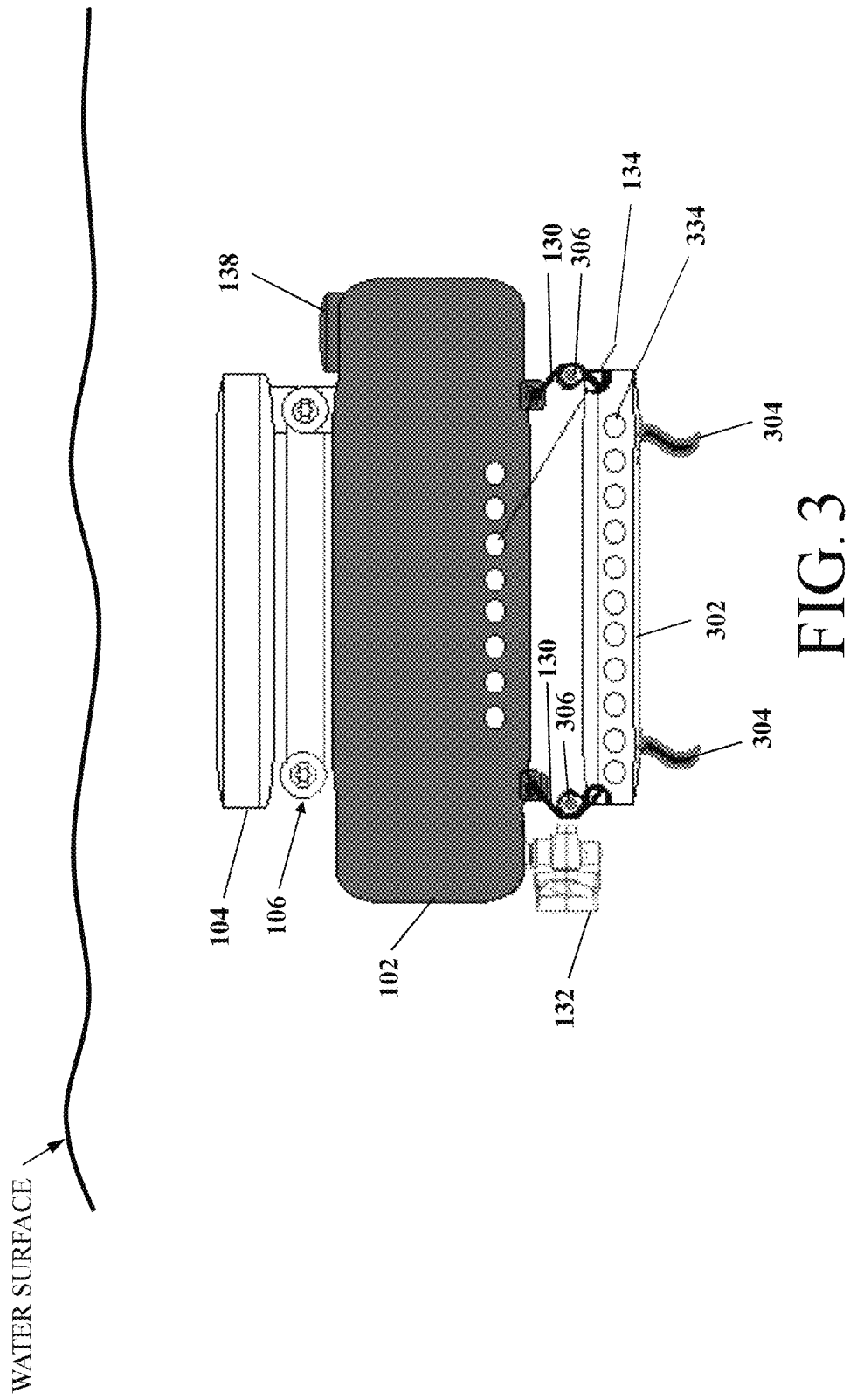
FIG. 3 shows a side view of the submersible forward deployed sensor system of FIG. 1 with a sensor array portion retracted or lowered below the water surface.

FIG. 3 shows a side or elevation view of the submersible forward deployed sensor system 100 of FIG. 1 with a sensor array portion retracted or lowered below the water surface, as well as a mooring anchor system/stabilization platform 302 retracted or raised toward the body 102. The mooring anchor system/platform 302 may also include mooring anchors 304 either affixed to a lower portion of the platform 302 as shown, or may further extend via the mooring cables 130 below the platform 302. Additionally, in one example the platform 302 may be lowered and raised using the mooring cables 130. In order to ensure that the cables do not tangle and smoothly retract and lower the platform 302, cable roller guides 306 may be utilized where the guides 306 are either affixed to the underside of the body 102 or to each other at a fixed distance (e.g., with rods or other rigid members) to maintain tension on the mooring cables to keep the cables on the guides 306. Although not shown, the mooring cables 130 may be retracted onto motorized spools or other winding devices within the sensor body 102 for letting out or retracting the mooring cables 130.

Figure 4:
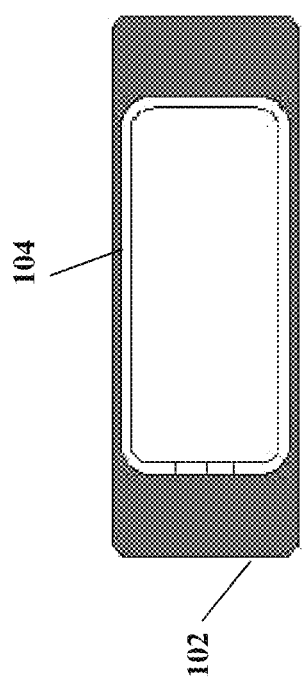
FIG. 4 shows a top view of the submersible forward deployed sensor system of FIG. 3 when the sensor array portion is retracted or lowered.

FIG. 3 also illustrates that, in addition to an array of sonar or acoustic sensors 134 disposed in the sensor body 102, the mooring anchor system/stabilization platform 302 may also include another array of sonar or acoustic sensors 334. The disposing of sonar or acoustic sensors 334 in the mooring anchor system/platform 302 allows for optimal placement of such sensors 334 at greater depths to be able to better detect underwater threats such as submarines. It will be appreciated by those skilled in the art that FIG. 4 shows a top view of the submersible forward deployed sensor system of FIGS. 1-3 when the sensor array portion 104 is either fully retracted or lowered. As may be seen, the sensor array portion 104 may have a smaller area than the sensor body 102 to maintain a lower top profile in this example, but is not limited to such. Additionally, it is noted here that the shape/geometry of the sensor body 102 is merely exemplary and various geometries are contemplated beyond that which is illustrated in FIGS. 1-4 and the disclosure is not limited to the illustrated shapes/geometries.

Figure 5:
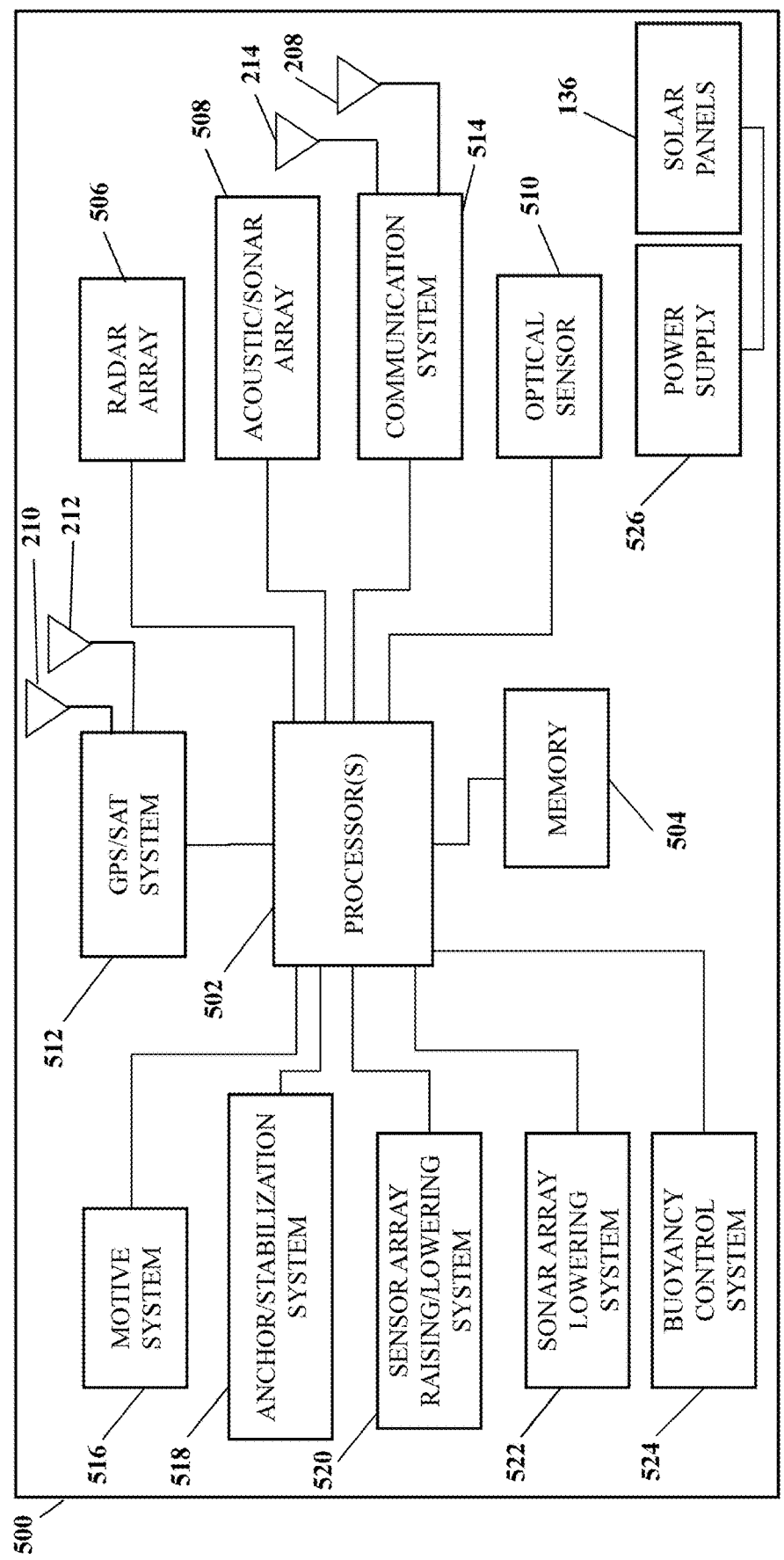
FIG. 5 shows a system block diagram of the various components of the submersible forward deployed sensor system according to one example.

FIG. 5 shows a system block diagram 500 of the various system components of the submersible forward deployed sensor system 100 according to one example. The system illustrated by diagram 500 includes one or more processors 502, which are linked to and effectuate control of the various other systems of the submersible forward deployed sensor system 100. The one or more processors 502 may be implemented by one or more general processors and/or one or more special processors configured for specific processes and operations. Additionally, the one or more processors 502 may be coupled to one or more memory devices 504, which have instructions stored thereon to be executed by the one or more processors 502 to implement the various functions or operations including directing the operation of the various systems or modules that will be discussed below.

As shown in the system block diagram 500, various systems or modules may be communicatively coupled with and under the control of the one or more processors 502. These systems or modules include a radar array system or module 506, which includes the radar system 202 disposed in the sensor array portion 104. Additionally, the system 100 may include an acoustic or sonar array system or module 508, which may include the sensors 134 and 334. Further, system 100 may include an optical detection system or module 510, which may include an optical sensor such as a camera, infrared detector, or other light spectrum detector. Optical detection system or module 510 may include the optical sensor and/or night/day camera 204 disposed in the sensor array portion 104.

In yet further aspects, the system 100 includes a GPS and/or Satellite communication system or module 512 configured for location/positioning and/or satellite communications. The GPS and/or Satellite communication system or module 512 may include the satellite antenna 210 and the GPS antenna 212 discussed above. Additional communications may be effectuated with communication system or module 514, which may include RF modems for RF communications utilizing the RF antenna array 214 comprising one or more antennas for RF communications using any one of various RF technologies, such as 5G technologies or local area network (LAN) communications, as examples. In yet other aspects, the communications system or module 514 may also effectuate optical communications, such as with the optical communications transmitter/receiver device 216. It is noted that in some aspects, after search and detection with the radar, sonar, or optical detection systems 506, 508, and 510, the various communications systems or modules 512 and/or 514 may be configured to pass detected target contacts to local submarines, ships, or elsewhere via satellite, RF, or optical links. In further aspects, the system 100 may be configured to transmit target information to the various remote locations, such as a shooter location or other offensive weapons platforms for targeting of such weapons to destroy or immobilize the detected threats or targets.

As further shown in FIG. 5, the system 100 may also include various motive, anchoring/stabilizing, sensor raising/lowering, and buoyancy control systems that are communicatively coupled to the one or more processors 502. In particular, the system 100 includes a motive system or module 516, which includes and controls the one or more electric thrusters 132. Further, the system 100 includes an anchor/stabilization system or module 518, which includes and controls the anchor/stabilization platform 302, as well as the extension and retraction of the mooring cables 130. Further, the system 100 includes a sensor array raising/lowering system or module 520, which controls the raising and lowering of the sensor array with the sensor raising/lowering system 106 by control of the pivot motors at pivot joints 112, 116, 122, as an example. Additionally, the system 100 may include a sonar array lowering system 522 that may operate in conjunction with the anchor/stabilization system or module 518 (and in some embodiments be part of module 518) to control the depth and operation of the sonar array 334. Still further, the system 100 includes a buoyancy or ballast control system or module 524. This system 524 includes the selective buoyancy system or ballast system 220 and may be operated to control the depth of the system 100 when threats or objects are detected or to further add stability to the system 100 under the control of one or more processors 502. This system 524 may further include stability, depth, pressure, or motion sensors (not shown) to provide control inputs for depth control and/or stabilization.

According to yet another aspect, the system 100 includes a power supply system 526, which may include one or more batteries for power storage, as well various circuitry for power modulation and power sleep modes to conserve energy (which may also be controlled in cooperation with the one or more processors 502). Additionally, coupled to the power supply system 526 is a source of power generation, such as solar array or panels 136 in one example. As described above, other means of power generation such as a wave motion generator may also be coupled to the power supply system. Although not shown in FIG. 5, those skilled in the art will appreciate that the various processors and modules in FIG. 5 are electrically coupled to the power supply system 526 for operation. The power supply system 526 may be configured or sized to allow the system 100 to remain on station monitoring the sea for months at a time.

As will be appreciated by those skilled in the art, the presently disclosed submersible forward sensor system 100 combines various separate functions for sensing, movement, navigation, and communication, as well as having the capability to submerge to avoid targeting and loss. In some aspects, the system 100 is expendable as there is no crew on board. The submersible forward sensor system 100 can also be used in situations to help monitor and assist vehicles in distress by relaying information to authorities. Additionally, in operation the submersible forward sensor system 100 maybe towed to its position by manned or unmanned submarines or marine vehicle. Furthermore (or alternatively), the submersible forward sensor system 100 may be able to navigate into position under its own power while submerged, drop anchor, and then raise the sensor array above water. The system 100 then may search with radar and pass all target contacts to local submarines, ships, and/or via satellite links. If the system 100 detects an object or target (or is detected), the system 100 may retract and submerge (and even sink to the ocean bottom) to wait some period of time or when a clear surface is detected. The system 100 would be able to remain undetected below a thermocline or on the bottom of the ocean. Yet further, the system 100 may be configured to submerge in a non-threat environment such as to avoid storms, which may be detected via the communications systems onboard or through motion detection indicating rough seas.

In yet further aspects, a method of operating a submersible sensor system (e.g., system 100) is contemplated. The method includes providing a system body having an adjustable buoyancy system enabling the system body to float at or beneath a water surface; a sensor array including a radar sensor, and providing a sensor array raising system coupled to at least a top surface of the sensor body and the sensor array, wherein the sensor array raising system is configured to selectively raise and lower the sensor array with respect to the system body and the water surface in order to selectively enable operation of the sensor array above the water surface. Next, the method then includes initiating detection for at least one object using the sensor array (i.e., initiating the scanning operation of the sensor array to scan for and detect an object (if such object is present), but not limiting the method to having to detect an object for practice of the method, only that the system is operable and scanning for potential objects). Further, the method may include communicating detected objects to a remote location using one of satellite, RF, or optical communications. Moreover, the method may include lowering the sensor array below the water surface with the sensor array raising system when an object is detected to allow the system to avoid detection.

Although the invention has been described in detail with reference to certain examples, variations and modifications exist within the spirit and scope of the invention as described and defined in the following claims.

The invention claimed is:

1. A submersible sensor system comprising:
   a system body having an adjustable buoyancy system enabling the system body to float at or beneath a water surface;
   a sensor array including a radar sensor; and
   a sensor array raising system coupled to at least a top surface of the system body and the sensor array, wherein the sensor array raising system is configured to selectively raise and lower the sensor array with respect to the system body and the water surface in order to selectively enable operation of the sensor array above the water surface,
   wherein the sensor array raising system comprises: at least a first arm and a second arm, the first arm having a first end rotationally coupled to a top surface of the system body with a first pivot joint and a second end opposite the first end of the first arm that is rotationally coupled to a first end of the second arm with a second pivot joint, and the second arm having a second end opposite the first end of the second arm that is rotationally coupled to the sensor array with a third pivot joint.

2. The submersible sensor system of claim 1, wherein the adjustable buoyancy system includes a ballast system inside the system body that is configured to adjust the buoyancy of the system body in order to selectively set a depth of the sensor body below the water surface.

3. The submersible sensor system of claim 1, wherein each of the first, second, and third pivot joints includes a motive driver configured to provide rotational force to rotationally move the first and second arms relative to each other, rotationally move the first arm relative to the system body, and rotationally move the sensor array relative to the second arm.

4. The submersible sensor system of claim 1, further comprising one or more propulsion device(s) for moving the submersible sensor system.

5. The submersible sensor system of claim 1, further comprising an anchor system configured to be raised to allow movement of the submersible sensor system or lowered to anchor and/or stabilize the submersible sensor system.

6. The submersible sensor system of claim 1, further comprising at least one acoustic or sonar array, wherein the at least one acoustic or sonar array is located within at least one of the system body or an anchor/stabilizing platform coupled to a bottom side of the system body.

7. The submersible sensor system of claim 1, further comprising an optical sensor for detecting objects.

8. The submersible sensor system of claim 1, further comprising an infrared sensor.

9. The submersible sensor system of claim 1, further comprising a satellite and/or global positioning system (GPS) communication system configured for at least one of satellite communication or determining geospatial positioning information.

10. The submersible sensor system of claim 1, further comprising a radio frequency (RF) communication system for communication with a remote transceiver.

11. The submersible sensor system of claim 1, further comprising an identification, friend or foe (IFF) antenna system.

12. The submersible sensor system of claim 1, further comprising a power supply including a renewable energy source.

13. The submersible sensor system of claim 12, wherein the renewable energy source includes one or a solar array or a wave motion energy generator.

14. A method of operating a submersible system comprising:
   providing:
      a system body having an adjustable buoyancy system enabling the system body to float at or beneath a water surface;
      a sensor array including a radar sensor; and
      a sensor array raising system coupled to at least a top surface of the system body and the sensor array, wherein the sensor array raising system is configured to selectively raise and lower the sensor array with respect to the system body and the water surface in order to selectively enable operation of the sensor array above the water surface,
      wherein the sensor array raising system comprises: at least a first arm and a second arm, the first arm having a first end rotationally coupled to a top surface of the system body with a first pivot joint and a second end opposite the first end of the first arm that is rotationally coupled to a first end of the second arm with a second pivot joint, and the second arm having a second end opposite the first end of the second arm that is rotationally coupled to the sensor array with a third pivot joint;

raising the sensor array with the sensor array raising system; and initiating detection for at least one object using the sensor array.

15. The method of claim 14, further comprising:
communicating detected objects to a remote location using one of satellite, RF, or optical communications.

16. The method of claim 14, further comprising:
lowering the sensor array below the water surface with the sensor array raising system when an object is detected to allow the system to avoid detection.

* * * * *